(12) United States Patent
Yapici et al.

(10) Patent No.: US 12,323,787 B2
(45) Date of Patent: Jun. 3, 2025

(54) INDEX MODULATION FOR PHY SIGNATURE SELECTION

(71) Applicant: QUALCOMM Incorporated, San Diego, CA (US)

(72) Inventors: Yavuz Yapici, Florham Park, NJ (US); Tao Luo, San Diego, CA (US); Igor Gutman, Hod HaSharon (IL); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/817,317

(22) Filed: Aug. 3, 2022

(65) Prior Publication Data
US 2024/0048968 A1    Feb. 8, 2024

(51) Int. Cl.
*H04W 12/00*    (2021.01)

(52) U.S. Cl.
CPC .................. *H04W 12/009* (2019.01)

(58) Field of Classification Search
CPC ............. H04W 12/009; H04W 12/106; H04W 12/122; H04W 12/79; H04L 2209/34; H04L 9/001; H04L 9/0866
See application file for complete search history.

(56) References Cited

U.S. PATENT DOCUMENTS

| | | | | |
|---|---|---|---|---|
| 2008/0194259 A1* | 8/2008 | Vujcic | ............... | H04W 74/0866 455/435.1 |
| 2017/0366209 A1* | 12/2017 | Weissman | ............... | H04L 27/38 |
| 2018/0287682 A1* | 10/2018 | Kwak | .................. | H04W 24/10 |
| 2021/0092593 A1* | 3/2021 | Yunusov | ................ | H04B 7/063 |
| 2021/0392497 A1 | 12/2021 | Gao et al. | | |
| 2022/0150063 A2* | 5/2022 | Ramabadran | ....... | H04W 12/037 |

OTHER PUBLICATIONS

IEEE; Cross-Layer Authentication based on Physical-Layer Signatures for Secure Vehicular Communication; Jun. 2022; Mahmoud et al. (Year: 2022).*
Bogale T.E., et al., "On the Number of RF Chains and Phase Shifters, and Scheduling Design With Hybrid Analog-Digital Beamforming", IEEE Transactions on Wireless Communications, IEEE Service Center, Piscataway, NJ, US, vol. 15, No. 5, May 1, 2016, pp. 3311-3326, XP011611837, ISSN: 1536-1276, Abstract.
International Search Report and Written Opinion—PCT/US2023/028217—ISA/EPO—Oct. 20, 2023.

* cited by examiner

*Primary Examiner* — Hirdepal Singh
(74) *Attorney, Agent, or Firm* — Procopio, Cory, Hargreaves & Savitch

(57) ABSTRACT

A first network node may transmit a first indication of a PHY signature pool including a plurality of PHY signatures to a second network node. The first network node may select at least one PHY signature from the plurality of PHY signatures. The first network node may transmit a second indication of the selected at least one PHY signature to the second network node. The first network node may transmit at least one message to the second network node based on the selected at least one PHY signature. The second network node may demodulate the at least one message based on the at least one PHY signature.

30 Claims, 13 Drawing Sheets

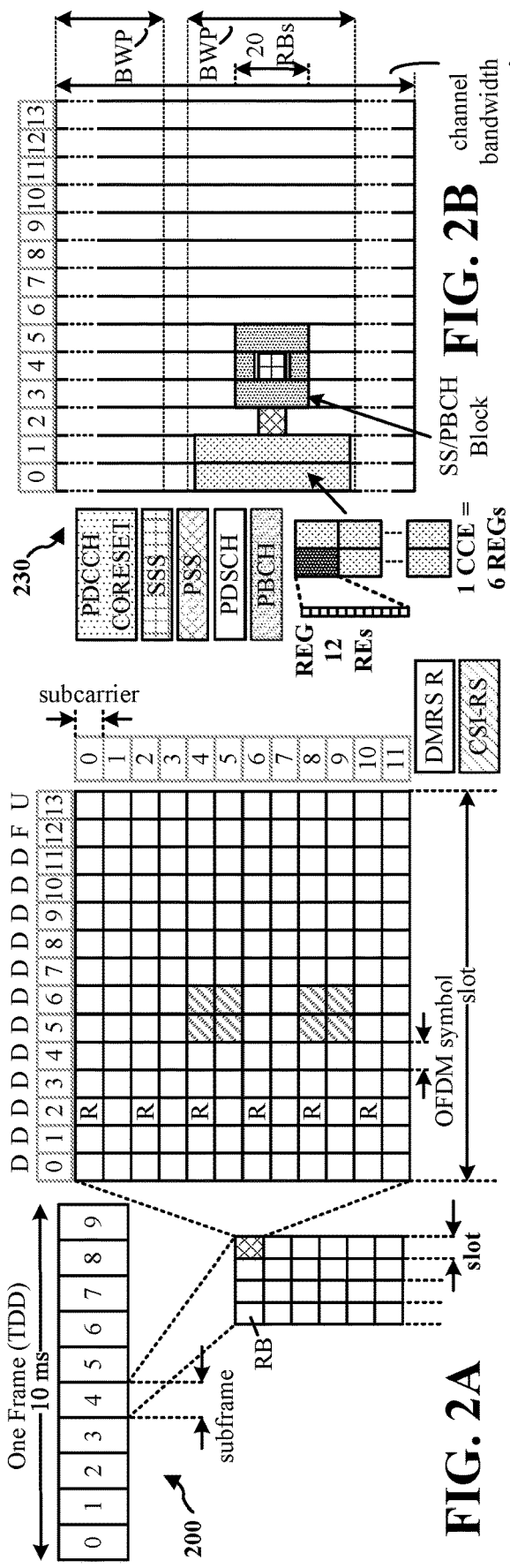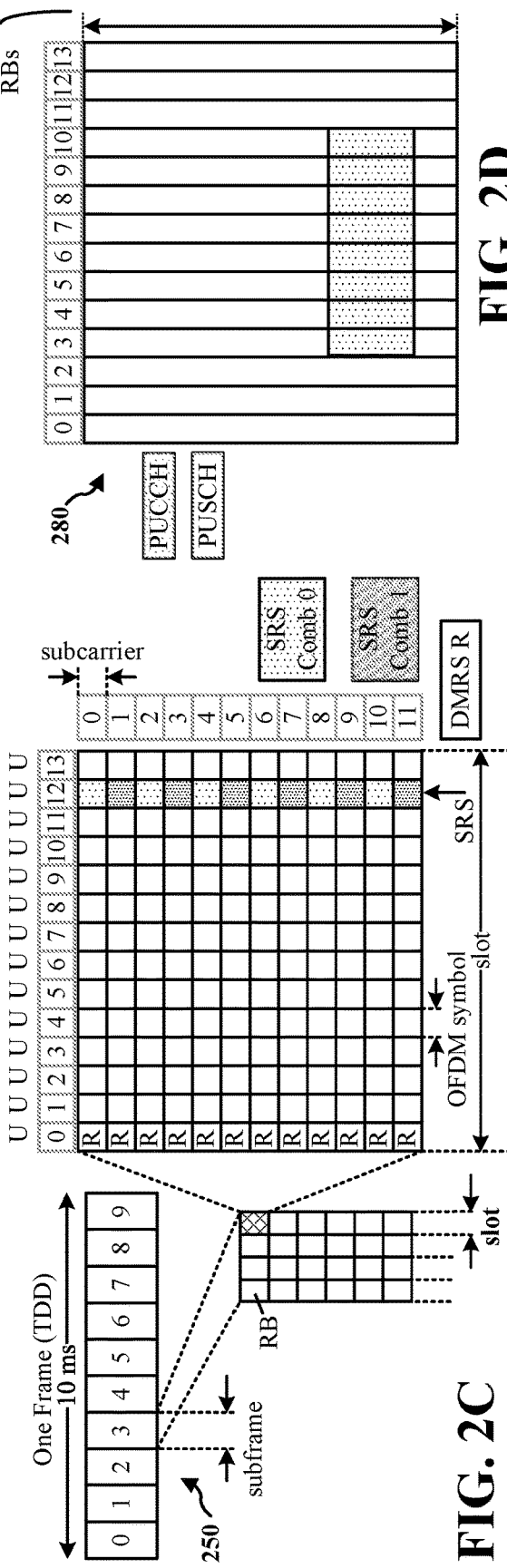
FIG. 2A
FIG. 2B
FIG. 2C
FIG. 2D

INDEX MODULATION FOR PHY SIGNATURE SELECTION

TECHNICAL FIELD

The present disclosure relates generally to communication systems, and more particularly, to physical layer (PHY) signature-based security in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first network node. The apparatus may transmit a first indication of a physical layer (PHY) signature pool including a plurality of PHY signatures to a second network node. The apparatus may select at least one PHY signature from the plurality of PHY signatures. The apparatus may transmit a second indication of the selected at least one PHY signature to the second network node. The apparatus may transmit at least one message to the second network node based on the selected at least one PHY signature.

In an aspect of the disclosure, a method, a computer-readable medium, and an apparatus are provided. The apparatus may be a second network node. The apparatus may receive a first indication of a PHY signature pool including a plurality of PHY signatures from a first network node. The apparatus may receive a second indication of at least one PHY signature in the plurality of PHY signatures from the first network node. The apparatus may receive at least one message from the first network node based on the at least one PHY signature. The apparatus may demodulate the at least one message based on the at least one PHY signature.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
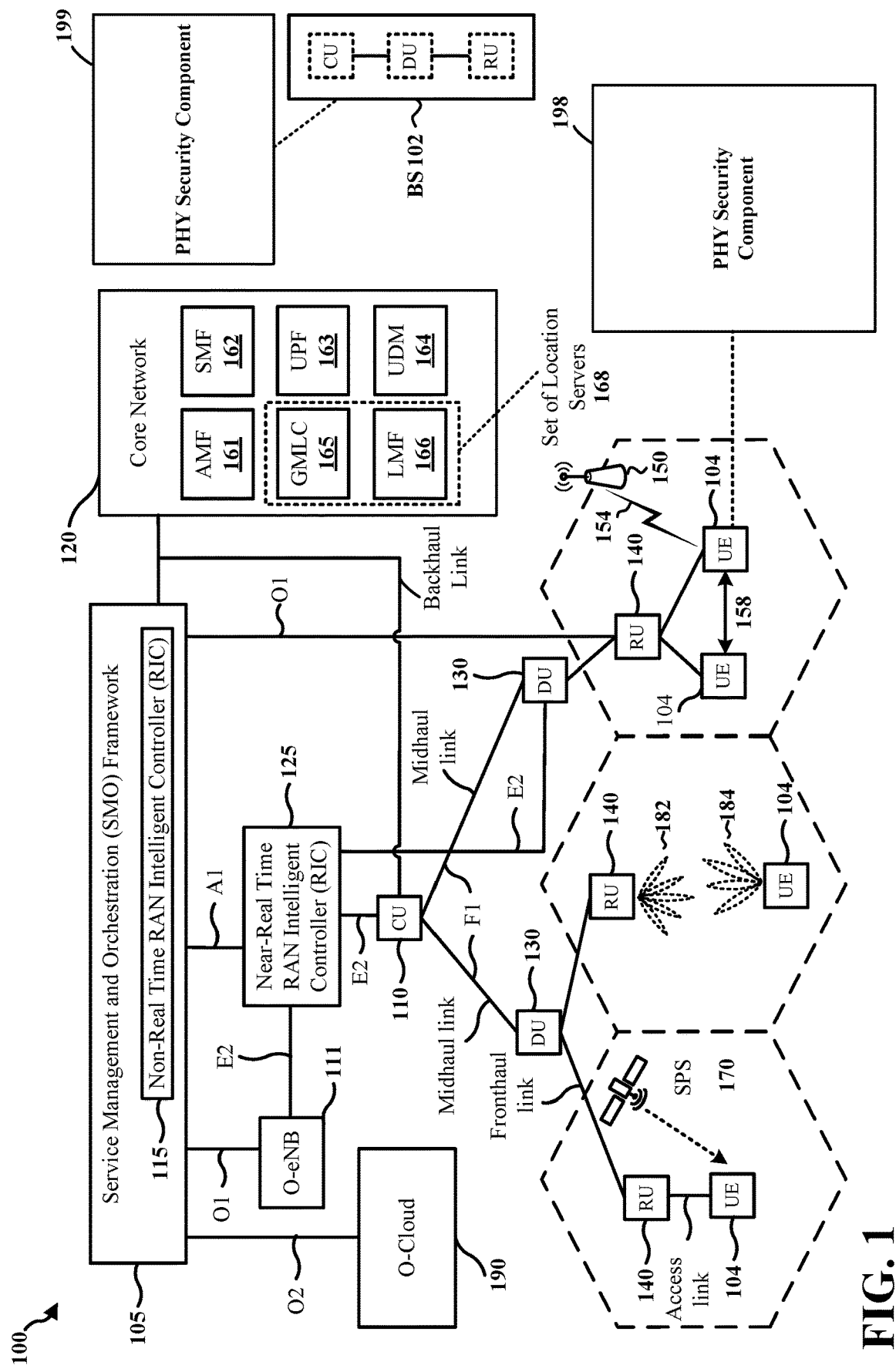
FIG. 1 is a diagram illustrating an example of a wireless communications system and an access network, in accordance with various aspects of the present disclosure.

User privacy and data confidentiality may be an integral part of a secure and reliable transmission protocol. For example, security in a wireless communication system may include providing sufficient data confidentiality and data integrity and ensuring availability of network services (e.g., against denial of service attacks). In some configurations, security may be achieved through cryptographic functions available in upper layers (i.e., layers higher than PHY). Physical control channels (e.g., physical downlink control channels (PDCCHs) and physical uplink control channels (PUCCHs)) and reference signals may be important in many 5G NR functionalities (e.g., channel estimation, UL/DL grant, positioning, etc.)

Absence of security protection for the physical control channels or the reference signals may make the respective transmissions vulnerable to malicious attacks. Further, the lack of security for the physical control channels or the reference signals may impair the reliability of subsequent functions.

In some configurations, artificial PHY impairment (e.g., amplitude-modulation-to-phase-modulation (AMPM) impairment or frequency domain residual sideband (FDRSB) impairment) may be embedded in a transmission as a signature to provide security and reliability directly in PHY. Some artificial PHY impairment techniques may not be able to handle increasing spectral efficiency while providing security.

One or more aspects of the disclosure may relate to an index modulation (IM) technique associated with artificial PHY impairment-based security in PHY. The IM technique may not only improve the spectral efficiency of the overall transmission, but also provide IM bits that may be available directly in PHY (i.e., without decoding). Accordingly, the technique may be suitable for low-latency applications.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PHY security component 198 that may be configured to receive a first indication of a PHY signature pool including a plurality of PHY signatures from a first network node. The PHY security component 198 may be configured to receive a second indication of at least one PHY signature in the plurality of PHY signatures from the first network node. The PHY security component 198 may be configured to receive at least one message from the first network node based on the at least one PHY signature. The PHY security component 198 may be configured to demodulate the at least one message based on the at least one PHY signature. In certain aspects, the base station 102 may include a PHY security component 199 that may be configured to transmit a first indication of a PHY signature pool including a plurality of PHY signatures to a second network node. The PHY security component 199 may be configured to select at least one PHY signature from the plurality of PHY signatures. The PHY security component 199 may be configured to transmit a second indication of the selected at least one PHY signature to the second network node. The PHY security component 199 may be configured to transmit at least one message to the second network node based on the selected at least one PHY signature. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
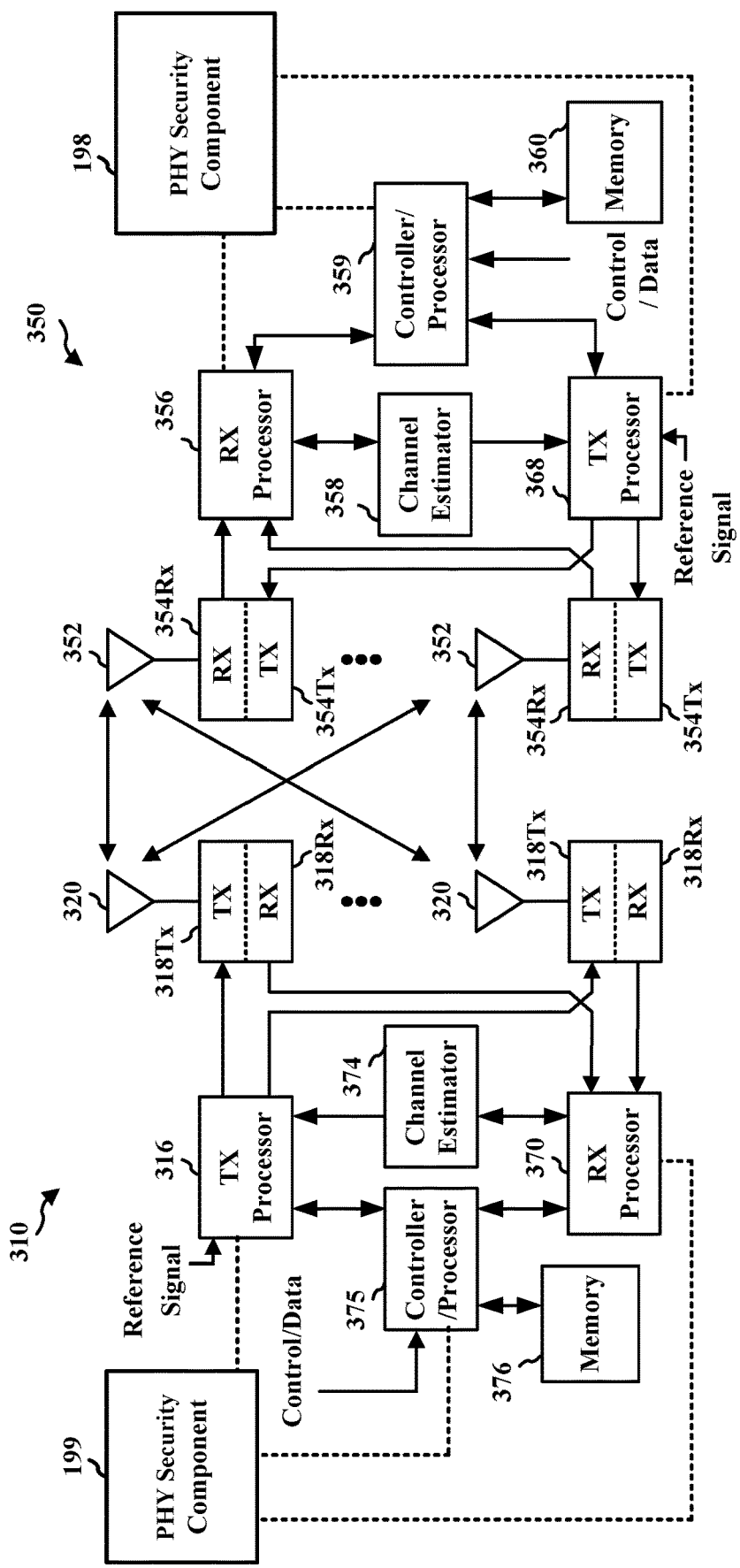
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PHY security component 198 of FIG. 1.

At least one of the TX processor 316, the RX processor 370, and the controller/processor 375 may be configured to perform aspects in connection with the PHY security component 199 of FIG. 1.

A transmitter may embed the artificial PHY impairment (e.g., AMPM impairment, FDRSB impairment, etc.) into the transmitted signal as a PHY signature to provide security and reliability directly in PHY. The PHY signature/impairment may be removed by a receiver that knows the embedded PHY signature. Therefore, with the use of the PHY signature, a passive eavesdropper may not be able to demodulate the message correctly because the eavesdropper may not know the exact embedded PHY signature even if the eavesdropper may succeed in capturing the message.

Figure 4:
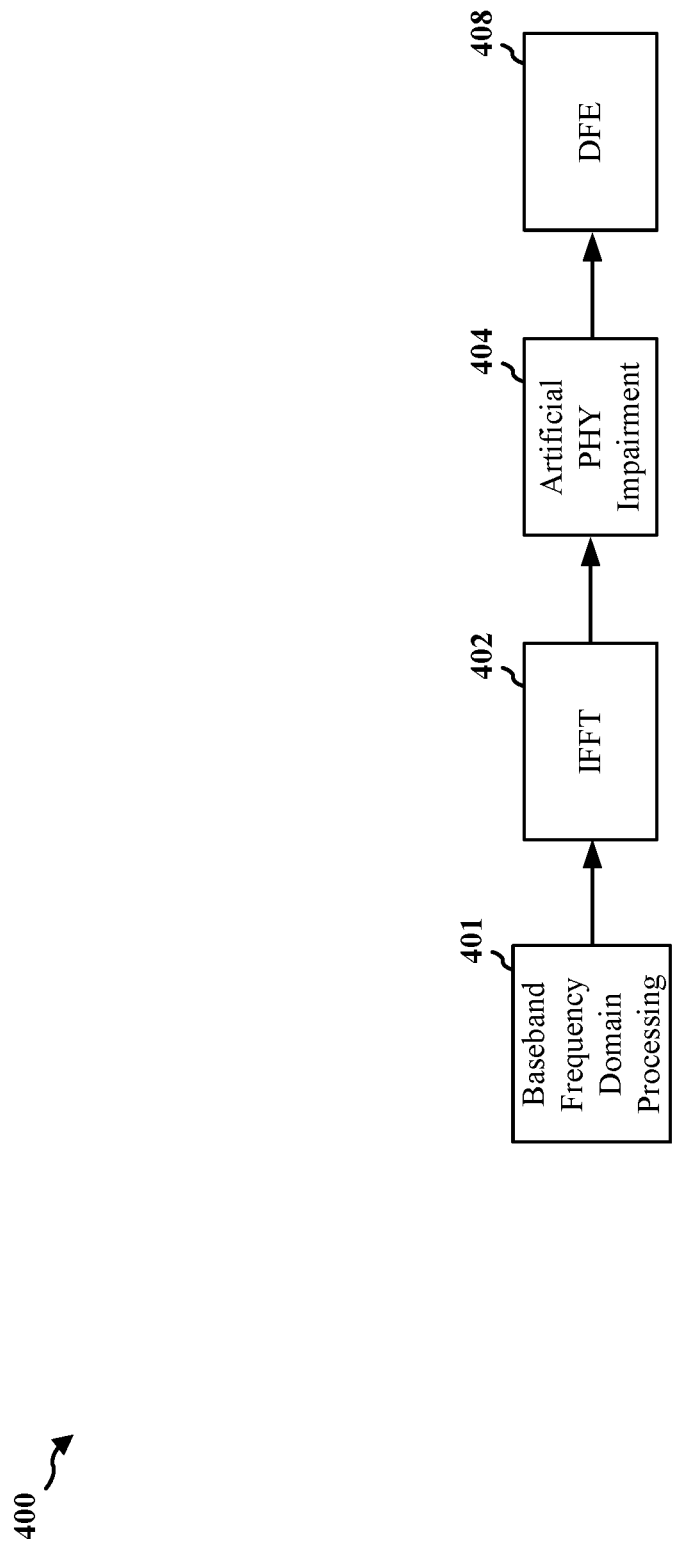
FIG. 4 is an example block diagram illustrating addition of an artificial physical layer (PHY) impairment, in accordance with various aspects of the present disclosure.

FIG. 4 is an example block diagram 400 illustrating addition of an artificial PHY impairment. For example, the artificial PHY impairment may be used as a signature that both authenticates the transmitter and encrypts the transmission. A receiver may receive an indication of the PHY impairment from the transmitter. Based on the indication, the receiver may confirm that a transmission with a PHY impairment consistent with the indication was transmitted by the transmitter. Further, the receiver may recover the content of the transmission by removing the PHY impairment based on the indication. Adding the artificial PHY impairment in the oversampled domain (e.g., the output of the digital front-end (DFE) block 408, also known as the digital to analog converter (DAC) input) may introduce out-of-band leakage, which may lead to a violation of the adjacent channel leakage ratio (ACLR) specification. Accordingly, the artificial PHY impairment may be added in the baseband domain at block 404 between the IFFT block 402 (The output of the baseband frequency domain processing block 401 may become the input to the IFFT block 402) and the DFE block 408.

Because the artificial PHY impairment is introduced in the baseband domain, all the impairment may be folded to the in-band, which may be associated with a cost in terms of the error vector magnitude (EVM). Further, the added artificial PHY impairment may be removed at the receiver. However, due to other impairments (e.g., thermal noise, channel noise, etc.), the removal of the artificial PHY impairment at the receiver may not be perfect. In one or more configurations, if the artificial PHY impairment is also added to the at least one data portion of the downlink traffic (e.g., PDSCH and/or PDCCH), a digital post-distortion (DPoD) technique (which may be applied iteratively) may be utilized to improve (e.g., reduce) the EVM associated with the at least one data portion of the downlink traffic.

In some configurations, to implement the artificial PHY impairment, the transmitter may provide indications of the type of and the parameters associated with the embedded PHY signature to the receiver. For example, the transmitter may transmit the indications to the receiver via layer 3 (L3) signaling or via a PHY security reference signal (SERS) in an authentic and PHY-secure fashion.

In some other configurations, a signature pool including potential artificial PHY signatures may be shared securely between the transmit-receive pair ahead of time (i.e., before the transmitter transmits a message protected by the artificial PHY signature). For example, the signature pool may include all possible artificial PHY impairments/signatures (e.g., AMPM impairment, FDRSB impairment, etc.) that the transmitter may use. Thereafter, the transmitter may refer to a PHY signature to be used by the index of the PHY signature in the pool. In other words, the transmitter may send the index of the PHY signature to the receiver to let the receiver know the PHY signature in use/to be used, and the receiver may remove the PHY impairment accordingly.

In some configurations, the index transmitted by the transmitter may be further used to carry additional information bits (e.g., as in an IM framework). Using the index to carry the additional information bits may be beneficial in low latency applications because the information is immediately available upon receipt without further decoding. Further techniques may be used in a multiple-antenna scenario where the transmitter may use a single RF chain or multiple RF chains.

Figure 5:
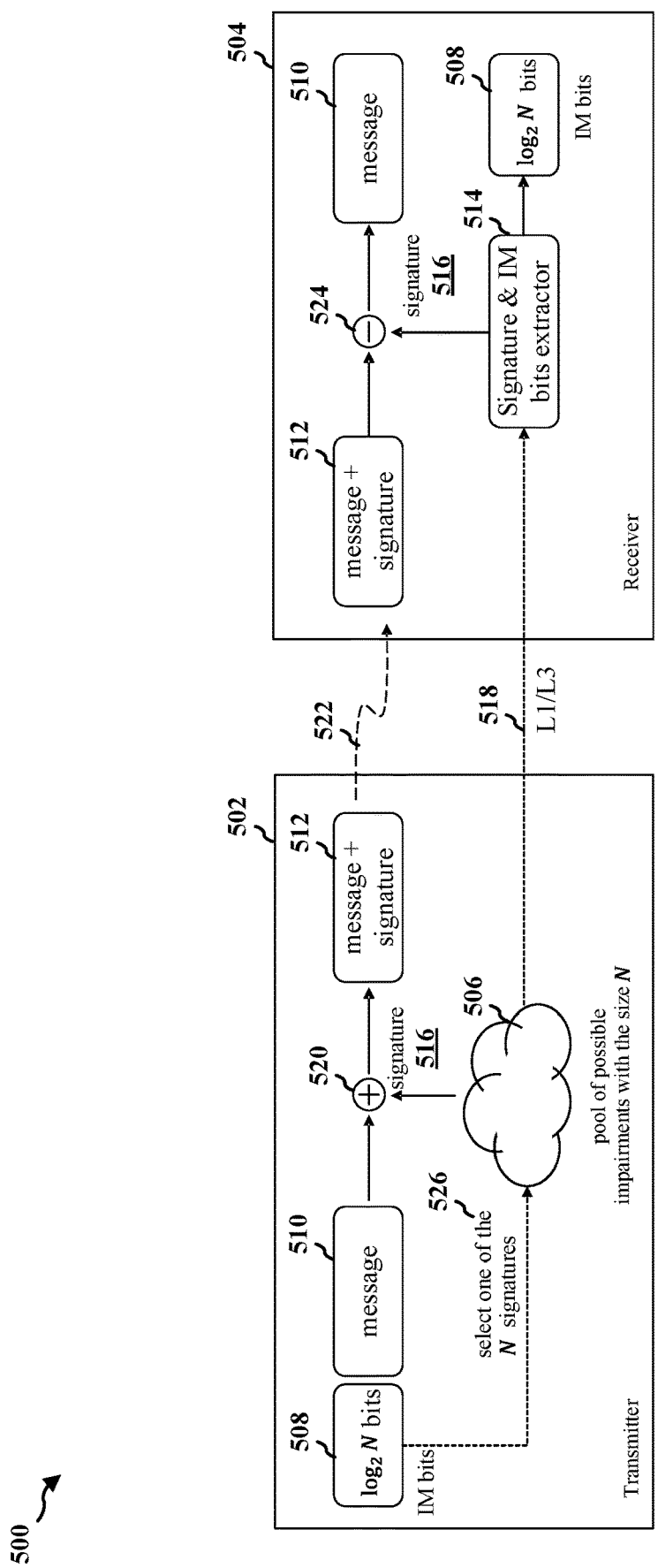
FIG. 5 is a diagram of an example process associated with index modulation for PHY signature selection, in accordance with various aspects of the present disclosure.

FIG. 5 is a diagram of an example process 500 associated with index modulation for PHY signature selection according to one or more aspects. As shown, in some examples, the transmitter 502 may correspond to a base station/network node, and the receiver 504 may correspond to a UE. Although some aspects are described in relation to a base station/network node being a transmitter and a UE being a receiver, the disclosure is not so limited. In some additional examples, the transmitter and the receiver may be other network nodes. For example, both the transmitter and the receiver may be base stations/network nodes (e.g., IAB nodes) or UEs. In some further examples, the transmitter may be a UE and the receiver may be a base station/network node.

The transmitter 502 and the receiver 504 may share, via a link 518 (which may be a layer 1 (L1)/PHY link or an L3 link), a signature pool 506. The signature pool 506 may include multiple possible artificial PHY impairments/signatures that may be used in a communication session between the transmitter 502 and the receiver 504. The signature pool 506 (e.g., an artificial PHY signature pool) may include artificial PHY signatures that are of a same type, or of different types. For example, AMPM signatures (e.g., the number of sine cycles, a delay, a frequency, and/or an amplitude of a sinusoid) and FDRSB signatures (e.g., an AR-type digital filter representing the phase mismatch between in-phase (I) and quadrature (Q) paths of transmit/receive chains) are two types of artificial PHY signatures that may be used. Other types of suitable artificial PHY signatures may also be used.

In different configurations, the signature pool 506 may be chosen by the transmitter 502 or by a network (e.g., a RAN or a core network) associated with the transmitter 502. The transmitter 502 may share, over the link 518, the signature pool 506 with the receiver 504 at the beginning of the communication session. For example, if the transmitter 502 is a base station and the receiver 504 is a UE, the base station may share the signature pool 506 with the UE when the UE becomes attached to the base station.

In different configurations, the transmitter 502 may share the signature pool 506 with the receiver 504 over an L3 link which may be secured (e.g., using cryptography) or a PHY (L1) link. If an L3 link is used for the sharing of the signature pool 506, the L3 link may be available after RRC establishment. Sharing the pool over an L3 link may be suitable for larger signature pools. A larger signature pool (e.g., signature pool 506) may be associated with more IM bits.

If a PHY link is to be used for the sharing of the signature pool 506, the signature pool 506 may be shared over the PHY link in a PHY-secure fashion (e.g., using a phase-difference-based technique). The transmission of the signature pool 506 over the PHY link may be connectionless (i.e., without RRC establishment), which may be more convenient for smaller signature pools. A smaller signature pool (e.g., signature pool 506) may be associated with fewer IM bits.

In some configurations, the transmitter 502 (or the network associated with the transmitter 502) may define a lifetime (e.g., a validity duration) for the signature pool 506. The lifetime of the signature pool 506 may be independent from the session duration, as such, the lifetime of the signature pool 506 may be shorter or longer than the session duration. In one configuration, the transmitter 502 (or the network associated with the transmitter 502) may revoke a current signature pool (e.g., signature pool 506 (or any PHY signature therein)) before the lifetime expires. For example, the transmitter 502 may revoke a signature pool 506 before the lifetime of the signature pool 506 expires if the signature pool 506 or any of the entries (PHY signatures) in the signature pool 506 is assessed by the transmitter 502 as having been compromised (e.g., having become known by an adversary).

At 526, the transmitter 502 may choose a PHY signature 516 to embed into a message 510 to be transmitted. After modulating the index of the selected PHY signature 516 in the signature pool 506, the transmitter may transmit the index of the selected PHY signature 516 to the receiver 504 (e.g., over the link 518). At 520, the transmitter 502 may generate the signature-embedded message 512 by embedding the selected PHY signature 516 into the message 510. Thereafter, at 522, the transmitter 502 may transmit the signature-embedded message 512 to the receiver 504.

For a signature pool size of N, the index of a particular PHY signature in the signature pool 506 may be represented in $\log_2 N$ bits. These bits 508 may be referred to hereinafter as IM bits 508. The transmitter 502 may transmit the IM bits 508 to the receiver 504. In some configurations, the IM bits 508 may be directly available to the receiver 504 in PHY (i.e., without further decoding). Accordingly, the IM bits 508 may be suitable to be used as PHY command bits (e.g., DCI indication bits), especially for low latency applications. Therefore, the transmitter 502 may select the PHY signature 516 to be used based on the information (e.g., the PHY command bits, the DCI indication bits, etc.) the transmitter 502 intends to transmit to the receiver 504 via the IM technique, such that the IM bits 508 corresponding to the selected PHY signature 516 may convey the information that the transmitter 502 intends to transmit via the IM technique.

The index (e.g., the IM bits 508) may be transmitted by the transmitter 502 to the receiver 504 following a similar strategy to that used to transfer the signature pool 506, that is, via a secure L3 link (which may be associated with a slower update rate) or via a PHY link in a PHY-secure fashion (e.g., using the phase difference-based technique).

The receiver 504 may then obtain the index at 514 and may use the index to choose the corresponding PHY signature 516. At 524, the receiver 504 may remove the PHY signature 516 from one or more subsequent messages (e.g., signature-embedded messages 512) from the transmitter 502. For example, removing the PHY signature 516 from the signature-embedded message 512 may include demodulating the signature-embedded message 512 to recover the original message 510. Further, at 514, the receiver 504 may extract the IM bits 508 (e.g., the information conveyed therein), in parallel, as the receiver 504 obtains the index.

Figure 6:
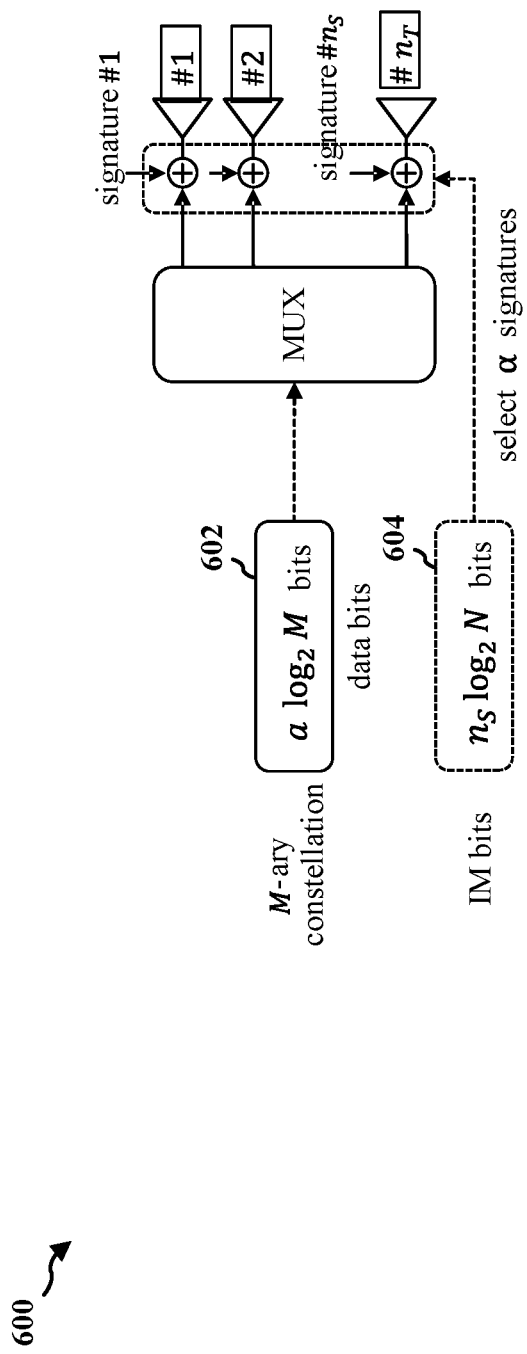
FIG. 6 is a diagram of an example process associated with index modulation for PHY signature selection in a multiple-antenna scenario, in accordance with various aspects of the present disclosure.

FIG. 6 is a diagram of an example process 600 associated with index modulation for PHY signature selection in a multiple-antenna scenario according to one or more aspects. A transmitter (not shown in FIG. 6) may share a PHY signature pool with a receiver (not shown in FIG. 6) in a similar fashion as the transmitter 502 in FIG. 5 shares the PHY signature pool (e.g., signature pool 506) with the receiver 504 in FIG. 5. Further, the transmitter may select a number ($n_A$) of active RF chains (e.g., out of $n_T$ RF chains in total) to use for transmission towards the receiver, where be $n_A \leq n_T$. Moreover, the transmitter may choose n s different PHY signatures to embed into the messages (streams) transmitted to the receiver via the $n_A$ active RF chains, where $1 \leq n_S \leq n_A$. Using multiple different PHY signatures across the various active RF chains may further increase the security protection level. Further, the $n_A$ active RF chains may be used to transmit different streams.

Therefore, in other words if $n_S=1$, then all the $n_A$ active RF chains may be impaired using a same PHY signature. On the other hand, if $n_S=n_A$, then each of $n_A$ active RF chains may be impaired using a respective different PHY signature. If $n_S$ falls between 1 and $n_A$ (exclusive), then multiple different PHY signatures may be used for the $n_A$ active RF chains while some of the $n_A$ active RF chains may share one or more of the same PHY signatures.

Accordingly, the transmitter may modulate the indices of the selected $n_S$ different PHY signatures, and may send the modulated indices to the receiver, in a similar fashion as the transmitter 502 in FIG. 5 transmits the modulated index for the selected the PHY signature 516 to the receiver 504 in FIG. 5 (e.g., via one or more secure L3 links (which may be associated with a slower update rate) or via one or more PHY links in a PHY-secure fashion (e.g., using the phase difference-based technique)).

For a pool size of N, the total number of IM bits 604 may be $n_S \log_2 N$, which may be $n_S$ times greater than the number of IM bits ($\log_2 N$) in a single antenna/RF chain scenario (e.g., the scenario illustrated in FIG. 5). The IM bits 604 may be directly available to the receiver in PHY without further decoding. Accordingly, the IM bits 604 may be used as PHY command bits (e.g., DCI indication bits). Using the IM bits 604 as PHY command bits may be particularly suitable for low latency applications.

Upon receiving the indices, the receiver may use the indices to choose the $n_S$ corresponding PHY signatures from the PHY signature pool. Further, the receiver may use the selected $n_S$ corresponding PHY signatures to remove the PHY signatures from subsequent messages from the transmitter. In other words, the receiver may demodulate the subsequent messages from the transmitter based on the selected $n_S$ corresponding PHY signatures to recover the original messages/data bits 602. Further, the receiver may also extract the IM bits 604 (e.g., the information conveyed therein), in parallel, as the receiver obtains the indices.

In one or more configurations, the $n_S$ active RF chains may also be referred to based on an index (e.g., an RF chain combination index), where the index may relate to an RF chain combination set including all subsets of the $n_T$ total RF chains. The RF chain combination index may be further exploited as additional IM bits in addition to the IM bits 604 associated with the PHY signature choice.

In one example, the transmitter may choose a subset of the $n_A$ active RF chains (layers) where signals transmitted via the chosen subset of active RF chains may carry a PHY signature and the signal transmitted via active RF chains that are not chosen may not carry a PHY signature. For example, the chosen subset of active RF chains may be associated with a higher signal strength or quality. This may be analogous to antenna port selection for phase tracking reference signal (PTRS) where stronger ports may be selected for the transmission of the PTRS.

In some configurations, the RF chain (layer) selection for PHY signature embedding may be based on a modulation and coding scheme (MCS) selected for a codeword (a codeword may be an output of an error-correcting code (e.g., the Polar code, the low-density parity-check (LDPC) code, etc.)). In some examples, a single RF chain (layer/antenna port) may be selected for each codeword for PHY signature embedding, as authenticating one RF chain (layer) based on the PHY signature embedded for that RF chain (layer) may also implicitly verify transmissions via other RF chains (layers) because the rate matching of coded bits may be spread out across the active RF chains (layers) within that codeword.

In one or more configurations, the set of antenna ports selected for PHY signature embedding (and relationship between the ports and the RF chains, as appropriate) may be communicated by the transmitter to the receiver (e.g., in a secure fashion, such as via one or more secure L3 links (which may be associated with a slower update rate) or via one or more PHY links in a PHY-secure fashion (e.g., using the phase difference-based technique).

In some further configurations, the choice of antenna ports for PHY signature embedding may also be exploited to produce yet another set of IM bits. In particular, $$\log_2 \binom{n_A}{n_{AP}}$$

bits may be transmitted based on the IM technique when $n_{AP}$ of $n_A$ active RF chains/antenna ports are chosen for PHY signature embedding.

Figure 7:
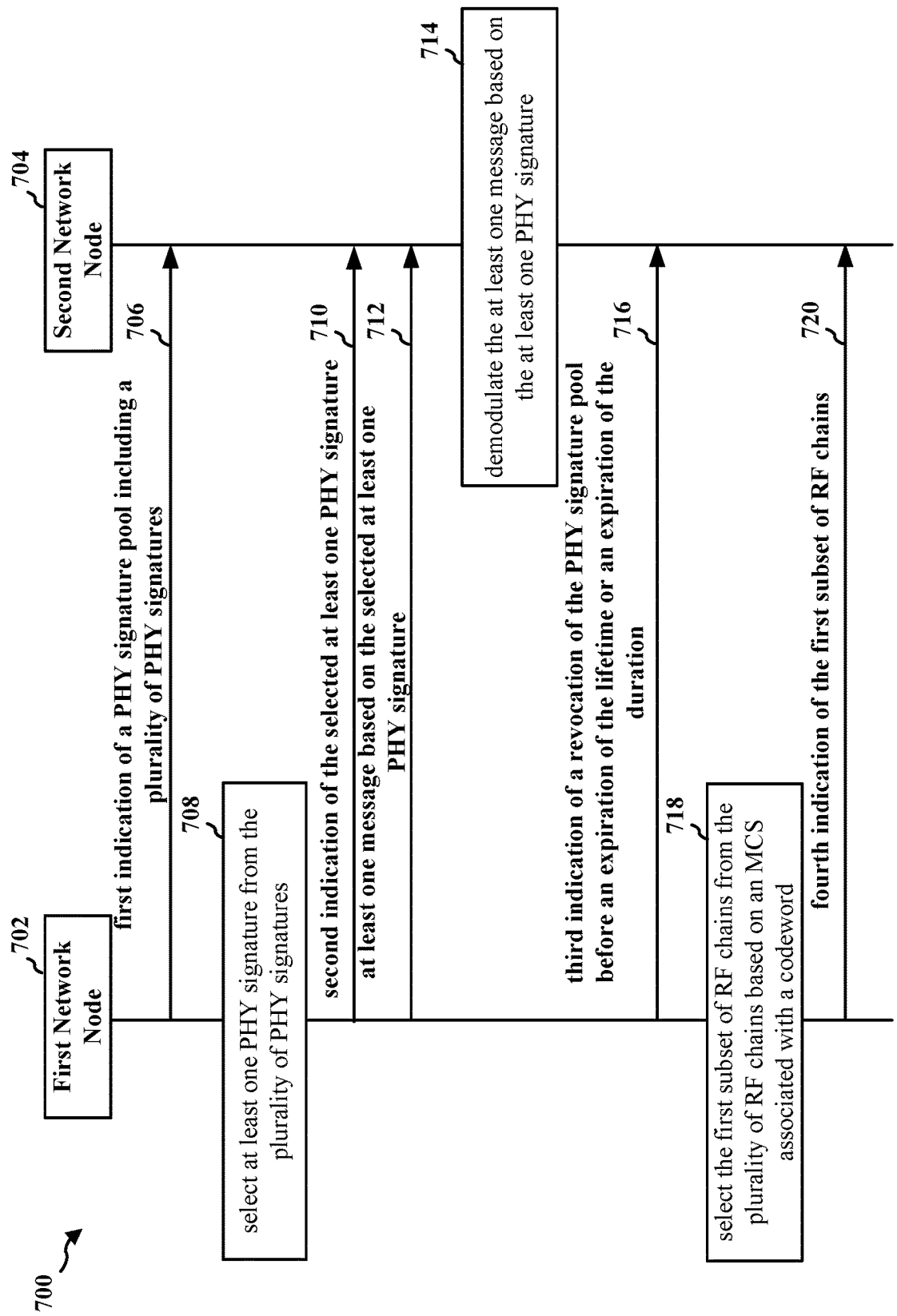
FIG. 7 is a diagram of a communication flow of a method of wireless communication, in accordance with various aspects of the present disclosure.

FIG. 7 is a diagram of a communication flow 700 of a method of wireless communication. The first network node 702 may correspond to the transmitter 502 in FIG. 5. Further, the second network node 704 may correspond to the receiver 504 in FIG. 5. At 706, the first network node 702 may transmit a first indication of a PHY signature pool including a plurality of PHY signatures to a second network node 704.

In one configuration, each PHY signature in the plurality of PHY signatures may be an AMPM signature or an FDRSB signature.

In one configuration, the first indication 706 of the PHY signature pool may be transmitted by the first network node 702 to the second network node 704 via PHY signaling or L3 signaling. The PHY signaling may not be associated with an RRC procedure. The L3 signaling may be associated with the RRC procedure.

At 708, the first network node 702 may select at least one PHY signature from the plurality of PHY signatures. In some configurations, the first network node 702 may select the at least one PHY signature based on additional information (e.g., PHY command bits, DCI indication bits, etc.) that the first network node 702 intends to convey to the second network node 704 based on the IM technique.

At 710, the first network node 702 may transmit a second indication of the selected at least one PHY signature to the second network node 704.

In one configuration, the second indication 710 of the selected at least one PHY signature may be transmitted by the first network node 702 to the second network node 704 via PHY signaling or L3 signaling.

In one configuration, the second indication 710 of the selected at least one PHY signature may include at least one PHY signature index associated with the selected at least one PHY signature. Accordingly, the second indication 710 may include additional information (e.g., PHY command bits, DCI indication bits, etc.) based on the IM technique.

At 712, the first network node 702 may transmit at least one message to the second network node 704 based on the selected at least one PHY signature.

At 714, the second network node 704 may demodulate the at least one message 712 based on the at least one PHY signature.

In one configuration, the PHY signature pool may be associated with a lifetime of the PHY signature pool or a duration of the PHY signature pool.

At 716, the first network node 702 may transmit a third indication of a revocation of the PHY signature pool to the second network node 704 before an expiration of the lifetime or an expiration of the duration.

In one configuration, the at least one message 712 may be transmitted by the first network node 702 to the second network node 704 using a plurality of RF chains. Each PHY signature in the selected at least one PHY signature may be associated with one or more respective RF chains in the plurality of RF chains.

In one configuration, the plurality of RF chains may be associated with an RF chain combination index. The first network node 702 may select the plurality of RF chains (from all RF chains of the first network node 702) based on additional information (e.g., PHY command bits, DCI indication bits, etc.) that the first network node 702 intends to convey to the second network node 704 based on the IM technique. Accordingly, an indication of the plurality of RF chains transmitted from the first network node 702 to the second network node 704 may include additional information (e.g., PHY command bits, DCI indication bits, etc.) based on the IM technique.

In one configuration, the plurality of RF chains may include a first subset of RF chains and a second subset of RF chains. The first subset of RF chains may be associated with PHY impairment based on the selected at least one PHY signature. The second subset of RF chains may not be associated with the PHY impairment.

At 718, the first network node 702 may select the first subset of RF chains from the plurality of RF chains based on an MCS associated with a codeword.

At 720, the first network node 702 may transmit a fourth indication of the first subset of RF chains to the second network node 704. In some configurations, the first subset of RF chains may be associated with another index (e.g., a second RF chain combination index). The first network node 702 may select, at 718, the first subset of RF chains based on additional information (e.g., PHY command bits, DCI indication bits, etc.) that the first network node 702 intends to convey to the second network node 704 based on the IM technique. Accordingly, the fourth indication 720 may include additional information (e.g., PHY command bits, DCI indication bits, etc.) based on the IM technique.

In one configuration, the fourth indication 720 of the first subset of RF chains may be transmitted by the first network node 702 to the second network node 704 via PHY signaling or L3 signaling.

Figure 8:
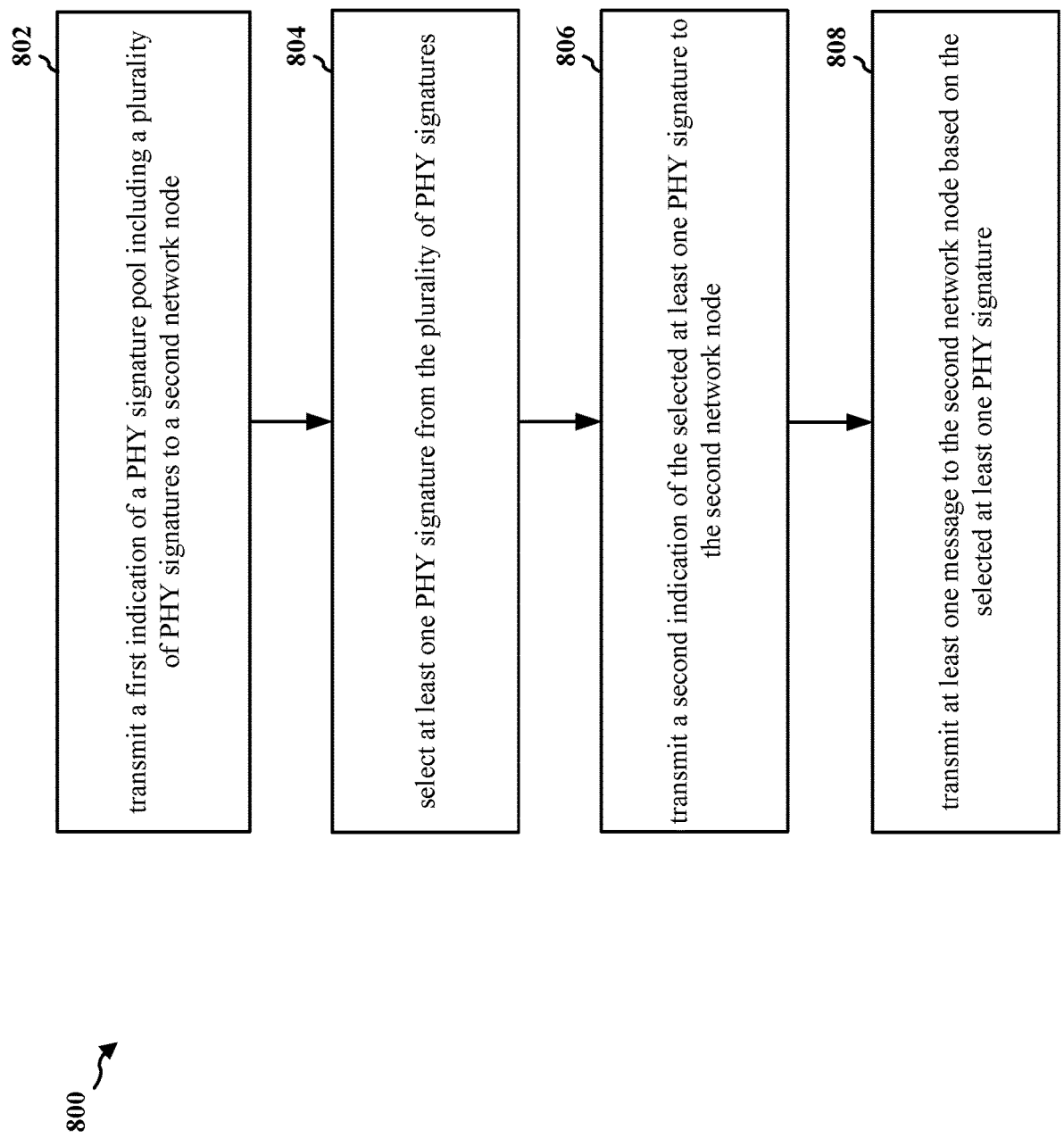
FIG. 8 is a flowchart of a method of wireless communication, in accordance with various aspects of the present disclosure.

FIG. 8 is a flowchart 800 of a method of wireless communication. The method may be performed by a first network node/base station (e.g., the base station 102/310; the first network node 702; the network entity 1202). At 802, the first network node may transmit a first indication of a PHY signature pool including a plurality of PHY signatures to a second network node. For example, 802 may be performed by the component 199 in FIG. 13. Referring to FIG. 7, at 706, the first network node 702 may transmit a first indication of a PHY signature pool including a plurality of PHY signatures to a second network node 704.

At 804, the first network node may select at least one PHY signature from the plurality of PHY signatures. For example, 804 may be performed by the component 199 in FIG. 13. Referring to FIG. 7, at 708, the first network node 702 may select at least one PHY signature from the plurality of PHY signatures.

At 806, the first network node may transmit a second indication of the selected at least one PHY signature to the second network node. For example, 806 may be performed by the component 199 in FIG. 13. Referring to FIG. 7, at 710, the first network node 702 may transmit a second indication of the selected at least one PHY signature to the second network node 704.

At 808, the first network node may transmit at least one message to the second network node based on the selected at least one PHY signature. For example, 808 may be performed by the component 199 in FIG. 13. Referring to FIG. 7, at 712, the first network node 702 may transmit at least one message to the second network node 704 based on the selected at least one PHY signature.

Figure 9:
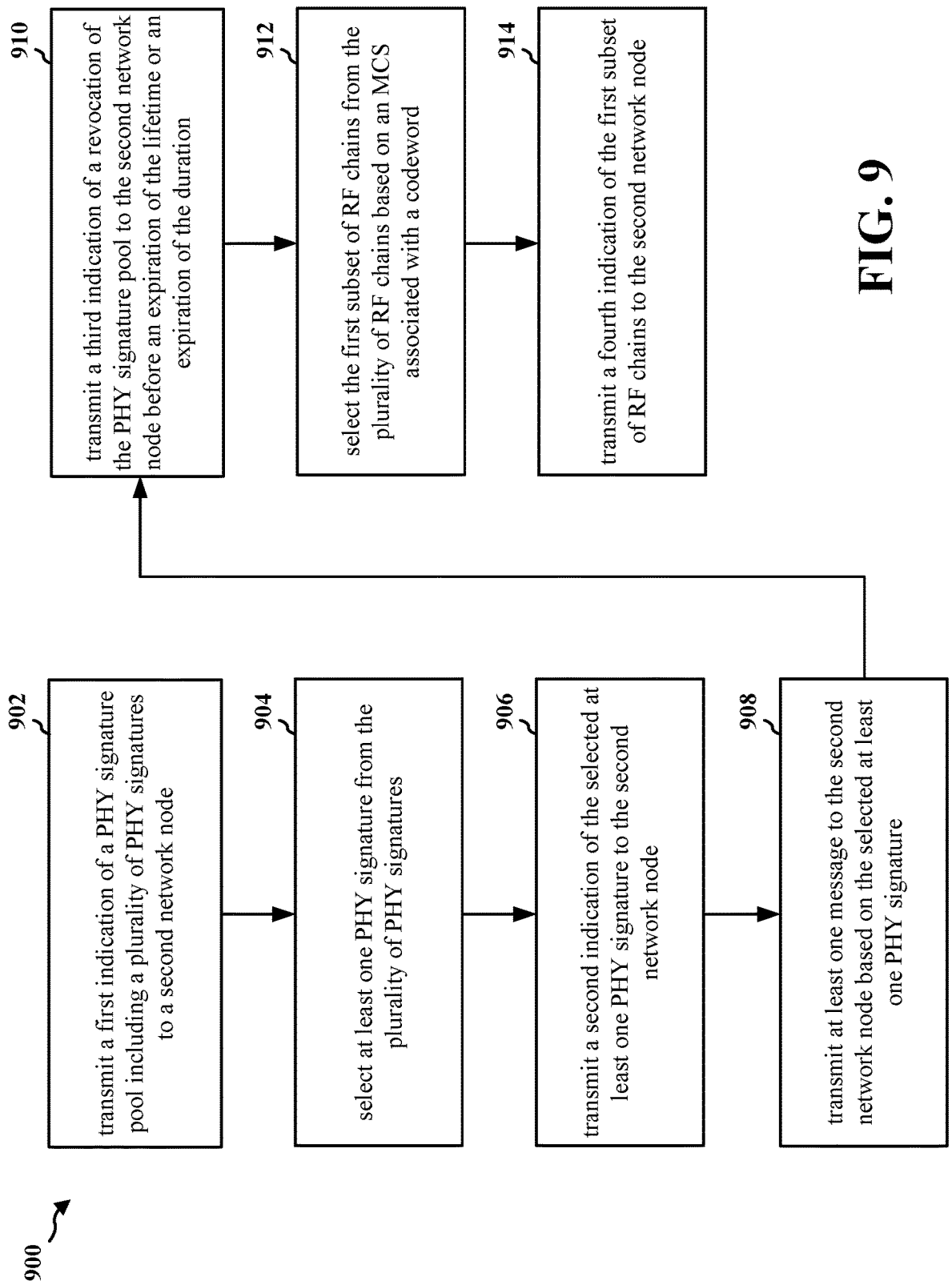
FIG. 9 is a flowchart of a method of wireless communication, in accordance with various aspects of the present disclosure.

FIG. 9 is a flowchart 900 of a method of wireless communication. The method may be performed by a first network node/base station (e.g., the base station 102/310; the first network node 702; the network entity 1202). At 902, the first network node may transmit a first indication of a PHY signature pool including a plurality of PHY signatures to a second network node. For example, 902 may be performed by the component 199 in FIG. 13. Referring to FIG. 7, at 706, the first network node 702 may transmit a first indication of a PHY signature pool including a plurality of PHY signatures to a second network node 704.

At 904, the first network node may select at least one PHY signature from the plurality of PHY signatures. For example, 904 may be performed by the component 199 in FIG. 13. Referring to FIG. 7, at 708, the first network node 702 may select at least one PHY signature from the plurality of PHY signatures.

At 906, the first network node may transmit a second indication of the selected at least one PHY signature to the second network node. For example, 906 may be performed by the component 199 in FIG. 13. Referring to FIG. 7, at 710, the first network node 702 may transmit a second indication of the selected at least one PHY signature to the second network node 704.

At 908, the first network node may transmit at least one message to the second network node based on the selected at least one PHY signature. For example, 908 may be performed by the component 199 in FIG. 13. Referring to FIG. 7, at 712, the first network node 702 may transmit at least one message to the second network node 704 based on the selected at least one PHY signature.

In one configuration, each PHY signature in the plurality of PHY signatures may be an AMPM signature or an FDRSB signature.

In one configuration, referring to FIG. 7, the first indication 706 of the PHY signature pool may be transmitted to the second network node 704 via PHY signaling or L3 signaling. The PHY signaling may not be associated with an RRC procedure. The L3 signaling may be associated with the RRC procedure.

In one configuration, referring to FIG. 7, the second indication 710 of the selected at least one PHY signature may be transmitted to the second network node 704 via PHY signaling or L3 signaling.

In one configuration, referring to FIG. 7, the second indication 710 of the selected at least one PHY signature may include at least one PHY signature index associated with the selected at least one PHY signature.

In one configuration, the PHY signature pool may be associated with a lifetime of the PHY signature pool or a duration of the PHY signature pool.

In one configuration, at 910, the first network node may transmit a third indication of a revocation of the PHY signature pool to the second network node before an expiration of the lifetime or an expiration of the duration. For example, 910 may be performed by the component 199 in FIG. 13. Referring to FIG. 7, at 716, the first network node 702 may transmit a third indication of a revocation of the PHY signature pool to the second network node 704 before an expiration of the lifetime or an expiration of the duration.

In one configuration, referring to FIG. 7, the at least one message 712 may be transmitted to the second network node 704 using a plurality of RF chains. Each PHY signature in the selected at least one PHY signature may be associated with one or more respective RF chains in the plurality of RF chains.

In one configuration, the plurality of RF chains may be associated with an RF chain combination index.

In one configuration, the plurality of RF chains may include a first subset of RF chains and a second subset of RF chains. The first subset of RF chains may be associated with PHY impairment based on the selected at least one PHY signature. The second subset of RF chains may not be associated with the PHY impairment.

In one configuration, at 912, the first network node may select the first subset of RF chains from the plurality of RF chains based on an MCS associated with a codeword. For example, 912 may be performed by the component 199 in FIG. 13. Referring to FIG. 7, at 718, the first network node 702 may select the first subset of RF chains from the plurality of RF chains based on an MCS associated with a codeword.

At 914, the first network node may transmit a fourth indication of the first subset of RF chains to the second network node. For example, 914 may be performed by the component 199 in FIG. 13. Referring to FIG. 7, at 720, the first network node 702 may transmit a fourth indication of the first subset of RF chains to the second network node 704.

In one configuration, referring to FIG. 7, the fourth indication 720 of the first subset of RF chains may be transmitted to the second network node 704 via PHY signaling or L3 signaling.

Figure 10:
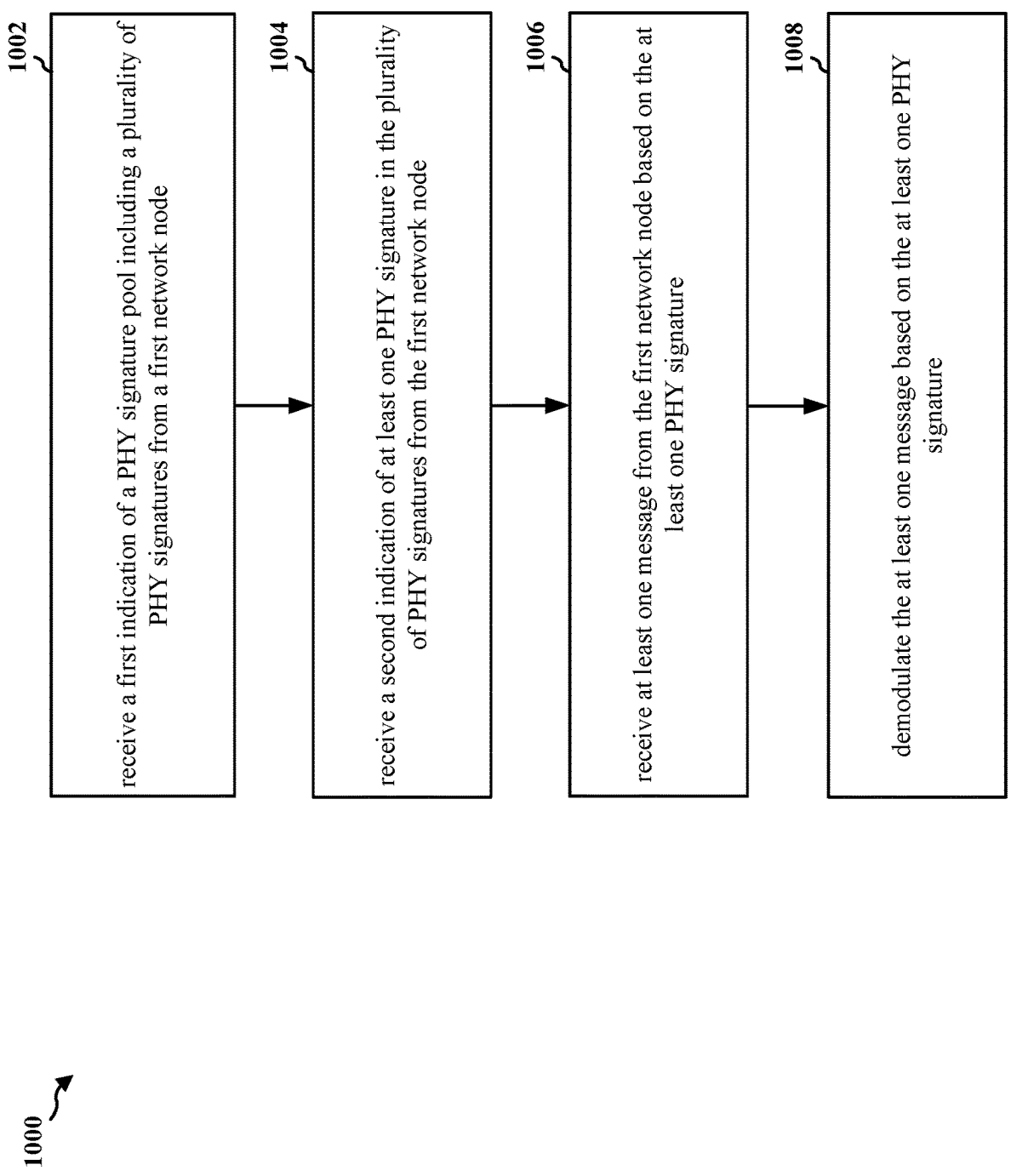
FIG. 10 is a flowchart of a method of wireless communication, in accordance with various aspects of the present disclosure.

FIG. 10 is a flowchart 1000 of a method of wireless communication. The method may be performed by a second network node/UE (e.g., the UE 104/350; the second network node 704; the apparatus 1204). At 1002, the second network node may receive a first indication of a PHY signature pool including a plurality of PHY signatures from a first network node. For example, 1002 may be performed by the component 198 in FIG. 12. Referring to FIG. 7, at 706, the second network node 704 may receive a first indication of a PHY signature pool including a plurality of PHY signatures from a first network node 702.

At 1004, the second network node may receive a second indication of at least one PHY signature in the plurality of PHY signatures from the first network node. For example, 1004 may be performed by the component 198 in FIG. 12. Referring to FIG. 7, at 710, the second network node 704 may receive a second indication of at least one PHY signature in the plurality of PHY signatures from the first network node 702.

At 1006, the second network node may receive at least one message from the first network node based on the at least one PHY signature. For example, 1006 may be performed by the component 198 in FIG. 12. Referring to FIG. 7, at 712, the second network node 704 may receive at least one message from the first network node 702 based on the at least one PHY signature.

At 1008, the second network node may demodulate the at least one message based on the at least one PHY signature. For example, 1008 may be performed by the component 198 in FIG. 12. Referring to FIG. 7, at 714, the second network node 704 may demodulate the at least one message 712 based on the at least one PHY signature.

Figure 11:
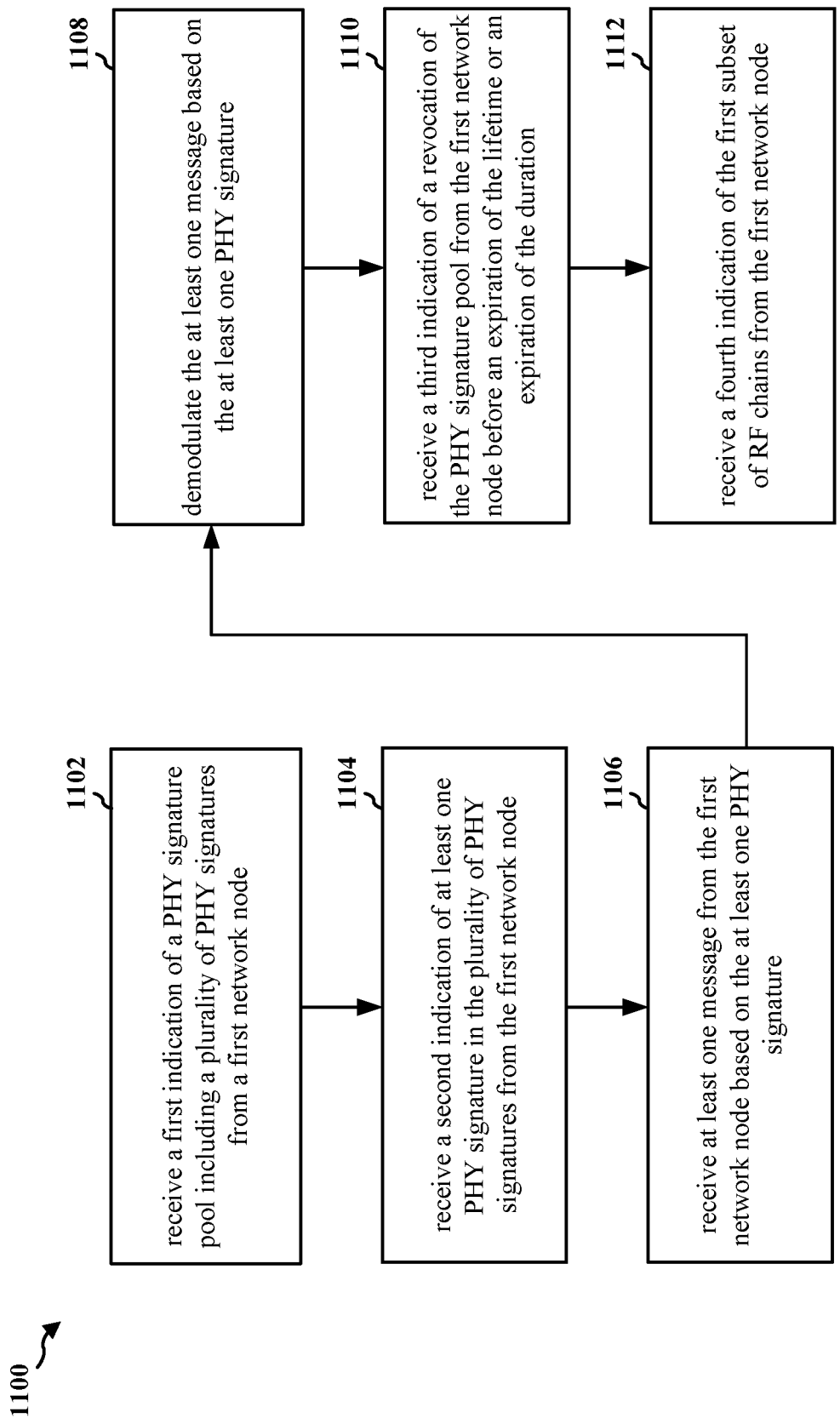
FIG. 11 is a flowchart of a method of wireless communication, in accordance with various aspects of the present disclosure.

FIG. 11 is a flowchart 1100 of a method of wireless communication. The method may be performed by a second network node/UE (e.g., the UE 104/350; the second network node 704; the apparatus 1204). At 1102, the second network node may receive a first indication of a PHY signature pool including a plurality of PHY signatures from a first network node. For example, 1102 may be performed by the component 198 in FIG. 12. Referring to FIG. 7, at 706, the second network node 704 may receive a first indication of a PHY signature pool including a plurality of PHY signatures from a first network node 702.

At 1104, the second network node may receive a second indication of at least one PHY signature in the plurality of PHY signatures from the first network node. For example, 1104 may be performed by the component 198 in FIG. 12. Referring to FIG. 7, at 710, the second network node 704 may receive a second indication of at least one PHY signature in the plurality of PHY signatures from the first network node 702.

At 1106, the second network node may receive at least one message from the first network node based on the at least one PHY signature. For example, 1106 may be performed by the component 198 in FIG. 12. Referring to FIG. 7, at 712, the second network node 704 may receive at least one message from the first network node 702 based on the at least one PHY signature.

At 1108, the second network node may demodulate the at least one message based on the at least one PHY signature. For example, 1108 may be performed by the component 198 in FIG. 12. Referring to FIG. 7, at 714, the second network node 704 may demodulate the at least one message 712 based on the at least one PHY signature.

In one configuration, each PHY signature in the plurality of PHY signatures may be an AMPM signature or an FDRSB signature.

In one configuration, referring to FIG. 7, the first indication 706 of the PHY signature pool may be received from the first network node 702 via PHY signaling or L3 signaling. The PHY signaling may not be associated with an RRC procedure. The L3 signaling may be associated with the RRC procedure.

In one configuration, referring to FIG. 7, the second indication 710 of the at least one PHY signature may be received from the first network node 702 via PHY signaling or L3 signaling.

In one configuration, referring to FIG. 7, the second indication 710 of the at least one PHY signature may include at least one PHY signature index associated with the at least one PHY signature.

In one configuration, the PHY signature pool may be associated with a lifetime of the PHY signature pool or a duration of the PHY signature pool.

In one configuration, at 1110, the second network node may receive a third indication of a revocation of the PHY signature pool from the first network node before an expiration of the lifetime or an expiration of the duration. For example, 1110 may be performed by the component 198 in FIG. 12. Referring to FIG. 7, at 716, the second network node 704 may receive a third indication of a revocation of the PHY signature pool from the first network node 702 before an expiration of the lifetime or an expiration of the duration.

In one configuration, referring to FIG. 7, the at least one message 712 may be received from the first network node 702 via a plurality of RF chains at the first network node 702. Each PHY signature in the at least one PHY signature may be associated with one or more respective RF chains in the plurality of RF chains.

In one configuration, the plurality of RF chains may be associated with an RF chain combination index.

In one configuration, the plurality of RF chains may include a first subset of RF chains and a second subset of RF chains. The first subset of RF chains may be associated with PHY impairment based on the at least one PHY signature. The second subset of RF chains may not be associated with the PHY impairment.

In one configuration, at 1112, the second network node may receive a fourth indication of the first subset of RF chains from the first network node. The first subset of RF chains may be based on an MCS associated with a codeword. For example, 1112 may be performed by the component 198 in FIG. 12. Referring to FIG. 7, at 720, the second network node 704 may receive a fourth indication of the first subset of RF chains from the first network node 702.

In one configuration, referring to FIG. 7, the fourth indication 720 of the first subset of RF chains may be received from the first network node 702 via PHY signaling or L3 signaling.

Figure 12:
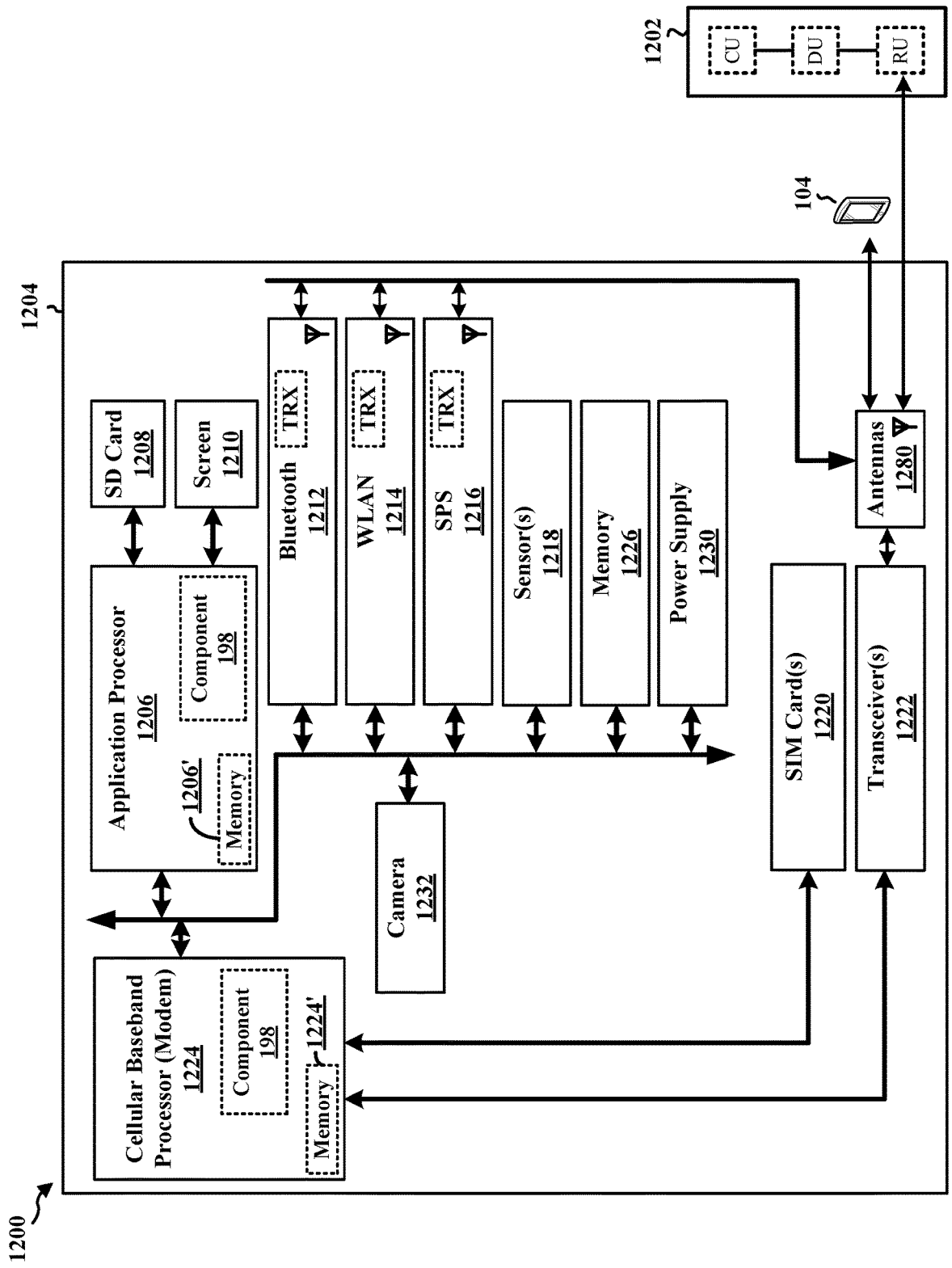
FIG. 12 is a diagram illustrating an example of a hardware implementation for an example apparatus and/or network entity, in accordance with various aspects of the present disclosure.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the component 198 is configured to receive a first indication of a PHY signature pool including a plurality of PHY signatures from a first network node. The component 198 may be configured to receive a second indication of at least one PHY signature in the plurality of PHY signatures from the first network node. The component 198 may be configured to receive at least one message from the first network node based on the at least one PHY signature. The component 198 may be configured to demodulate the at least one message based on the at least one PHY signature. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving a first indication of a PHY signature pool including a plurality of PHY signatures from a first network node. The apparatus 1204, and in particular the cellular baseband processor 1224 and/or the application processor 1206, includes means for receiving a second indication of at least one PHY signature in the plurality of PHY signatures from the first network node. The apparatus 1204, and in particular the cellular baseband processor 1224 and/or the application processor 1206, includes means for receiving at least one message from the first network node based on the at least one PHY signature. The apparatus 1204, and in particular the cellular baseband processor 1224 and/or the application processor 1206, includes means for demodulating the at least one message based on the at least one PHY signature.

In one configuration, each PHY signature in the plurality of PHY signatures may be an AMPM signature or an FDRSB signature. In one configuration, the first indication of the PHY signature pool may be received from the first network node via PHY signaling or L3 signaling. The PHY signaling may not be associated with an RRC procedure. The L3 signaling may be associated with the RRC procedure. In one configuration, the second indication of the at least one PHY signature may be received from the first network node via PHY signaling or L3 signaling. In one configuration, the second indication of the at least one PHY signature may include at least one PHY signature index associated with the at least one PHY signature. In one configuration, the PHY signature pool may be associated with a lifetime of the PHY signature pool or a duration of the PHY signature pool. In one configuration, the apparatus 1204, and in particular the cellular baseband processor 1224 and/or the application processor 1206, includes means for receiving a third indication of a revocation of the PHY signature pool from the first network node before an expiration of the lifetime or an expiration of the duration. In one configuration, the at least one message may be received from the first network node via a plurality of RF chains at the first network node. Each PHY signature in the at least one PHY signature may be associated with one or more respective RF chains in the plurality of RF chains. In one configuration, the plurality of RF chains may be associated with an RF chain combination index. In one configuration, the plurality of RF chains may include a first subset of RF chains and a second subset of RF chains. The first subset of RF chains may be associated with PHY impairment based on the at least one PHY signature. The second subset of RF chains may not be associated with the PHY impairment. In one configuration, the apparatus 1204, and in particular the cellular baseband processor 1224 and/or the application processor 1206, includes means for receiving a fourth indication of the first subset of RF chains from the first network node. The first subset of RF chains may be based on an MCS associated with a codeword. In one configuration, the fourth indication of the first subset of RF chains may be received from the first network node via PHY signaling or L3 signaling.

The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
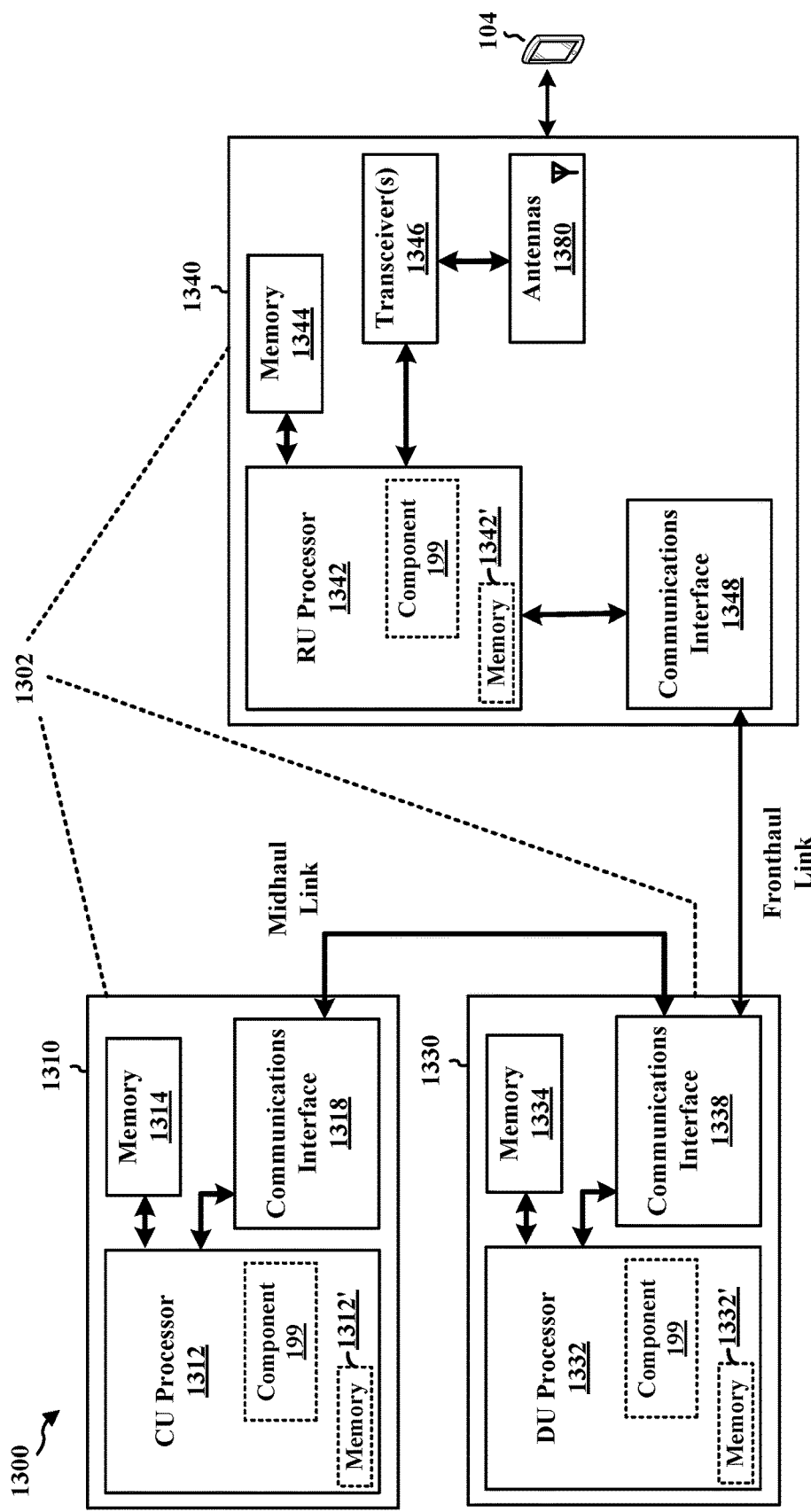
FIG. 13 is a diagram illustrating an example of a hardware implementation for an example network entity, in accordance with various aspects of the present disclosure.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit a first indication of a PHY signature pool including a plurality of PHY signatures to a second network node. The component 199 may be configured to select at least one PHY signature from the plurality of PHY signatures. The component 199 may be configured to transmit a second indication of the selected at least one PHY signature to the second network node. The component 199 may be configured to transmit at least one message to the second network node based on the selected at least one PHY signature. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting a first indication of a PHY signature pool including a plurality of PHY signatures to a second network node. The network entity 1302 includes means for selecting at least one PHY signature from the plurality of PHY signatures. The network entity 1302 includes means for transmitting a second indication of the selected at least one PHY signature to the second network node. The network entity 1302 includes means for transmitting at least one message to the second network node based on the selected at least one PHY signature.

In one configuration, each PHY signature in the plurality of PHY signatures may be an AMPM signature or an FDRSB signature. In one configuration, the first indication of the PHY signature pool may be transmitted to the second network node via PHY signaling or L3 signaling. The PHY signaling may not be associated with an RRC procedure. The L3 signaling may be associated with the RRC procedure. In one configuration, the second indication of the selected at least one PHY signature may be transmitted to the second network node via PHY signaling or L3 signaling. In one configuration, the second indication of the selected at least one PHY signature may include at least one PHY signature index associated with the selected at least one PHY signature. In one configuration, the PHY signature pool may be associated with a lifetime of the PHY signature pool or a duration of the PHY signature pool. In one configuration, the network entity 1302 includes means for transmitting a third indication of a revocation of the PHY signature pool to the second network node before an expiration of the lifetime or an expiration of the duration. In one configuration, the at least one message may be transmitted to the second network node using a plurality of RF chains. Each PHY signature in the selected at least one PHY signature may be associated with one or more respective RF chains in the plurality of RF chains. In one configuration, the plurality of RF chains may be associated with an RF chain combination index. In one configuration, the plurality of RF chains may include a first subset of RF chains and a second subset of RF chains. The first subset of RF chains may be associated with PHY impairment based on the selected at least one PHY signature. The second subset of RF chains may not be associated with the PHY impairment. In one configuration, the network entity 1302 includes means for selecting the first subset of RF chains from the plurality of RF chains based on an MCS associated with a codeword. The network entity 1302 includes means for transmitting a fourth indication of the first subset of RF chains to the second network node. In one configuration, the fourth indication of the first subset of RF chains may be transmitted to the second network node via PHY signaling or L3 signaling.

The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-13, a first network node may transmit a first indication of a PHY signature pool including a plurality of PHY signatures to a second network node. The first network node may select at least one PHY signature from the plurality of PHY signatures. The first network node may transmit a second indication of the selected at least one PHY signature to the second network node. The first network node may transmit at least one message to the second network node based on the selected at least one PHY signature. The second network node may demodulate the at least one message based on the at least one PHY signature. Accordingly, the IM technique may not only improve the spectral efficiency of the overall transmission, but also provide IM bits that may be available to the receiver directly in PHY without decoding.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network node, including transmitting a first indication of a PHY signature pool including a plurality of PHY signatures to a second network node; selecting at least one PHY signature from the plurality of PHY signatures; transmitting a second indication of the selected at least one PHY signature to the second network node; and transmitting at least one message to the second network node based on the selected at least one PHY signature.

Aspect 2 is the method of aspect 1, where each PHY signature in the plurality of PHY signatures is an AMPM signature or an FDRSB signature.

Aspect 3 is the method of aspect 1, where the first indication of the PHY signature pool is transmitted to the second network node via PHY signaling or L3 signaling, where the PHY signaling is not associated with an RRC procedure and the L3 signaling is associated with the RRC procedure.

Aspect 4 is the method of aspect 1, where the second indication of the selected at least one PHY signature is transmitted to the second network node via PHY signaling or L3 signaling.

Aspect 5 is the method of aspect 1, where the second indication of the selected at least one PHY signature includes at least one PHY signature index associated with the selected at least one PHY signature.

Aspect 6 is the method of aspect 1, where the PHY signature pool is associated with a lifetime of the PHY signature pool or a duration of the PHY signature pool.

Aspect 7 is the method of aspect 6, further including: transmitting a third indication of a revocation of the PHY signature pool to the second network node before an expiration of the lifetime or an expiration of the duration.

Aspect 8 is the method of aspect 1, where the at least one message is transmitted to the second network node using a plurality of RF chains, and each PHY signature in the selected at least one PHY signature is associated with one or more respective RF chains in the plurality of RF chains.

Aspect 9 is the method of aspect 8, where the plurality of RF chains is associated with an RF chain combination index.

Aspect 10 is the method of aspect 8, where the plurality of RF chains includes a first subset of RF chains and a second subset of RF chains, the first subset of RF chains is associated with PHY impairment based on the selected at least one PHY signature, and the second subset of RF chains is not associated with the PHY impairment.

Aspect 11 is the method of aspect 10, further including: selecting the first subset of RF chains from the plurality of RF chains based on an MCS associated with a codeword; and transmitting a fourth indication of the first subset of RF chains to the second network node.

Aspect 12 is the method of aspect 11, where the fourth indication of the first subset of RF chains is transmitted to the second network node via PHY signaling or L3 signaling.

Aspect 13 is a method of wireless communication at a second network node, including receiving a first indication of a PHY signature pool including a plurality of PHY signatures from a first network node; receiving a second indication of at least one PHY signature in the plurality of PHY signatures from the first network node; receiving at least one message from the first network node based on the at least one PHY signature; and demodulating the at least one message based on the at least one PHY signature.

Aspect 14 is the method of aspect 13, where each PHY signature in the plurality of PHY signatures is an AMPM signature or an FDRSB signature.

Aspect 15 is the method of aspect 13, where the first indication of the PHY signature pool is received from the first network node via PHY signaling or L3 signaling, where the PHY signaling is not associated with an RRC procedure and the L3 signaling is associated with the RRC procedure.

Aspect 16 is the method of aspect 13, where the second indication of the at least one PHY signature is received from the first network node via PHY signaling or L3 signaling.

Aspect 17 is the method of aspect 13, where the second indication of the at least one PHY signature includes at least one PHY signature index associated with the at least one PHY signature.

Aspect 18 is the method of aspect 13, where the PHY signature pool is associated with a lifetime of the PHY signature pool or a duration of the PHY signature pool.

Aspect 19 is the method of aspect 18, further including: receiving a third indication of a revocation of the PHY signature pool from the first network node before an expiration of the lifetime or an expiration of the duration.

Aspect 20 is the method of aspect 13, where the at least one message is received from the first network node via a plurality of RF chains at the first network node, and each PHY signature in the at least one PHY signature is associated with one or more respective RF chains in the plurality of RF chains.

Aspect 21 is the method of aspect 20, where the plurality of RF chains is associated with an RF chain combination index.

Aspect 22 is the method of aspect 20, where the plurality of RF chains includes a first subset of RF chains and a second subset of RF chains, the first subset of RF chains is associated with PHY impairment based on the at least one PHY signature, and the second subset of RF chains is not associated with the PHY impairment.

Aspect 23 is the method of aspect 22, further including: receiving a fourth indication of the first subset of RF chains from the first network node, where the first subset of RF chains is based on an MCS associated with a codeword.

Aspect 24 is the method of aspect 23, where the fourth indication of the first subset of RF chains is received from the first network node via PHY signaling or L3 signaling.

Aspect 25 is an apparatus for wireless communication including at least one processor coupled to a memory and, based at least in part on information stored in the memory, the at least one processor is configured to implement a method as in any of aspects 1 to 24.

Aspect 26 may be combined with aspect 25 and further includes a transceiver coupled to the at least one processor.

Aspect 27 is an apparatus for wireless communication including means for implementing any of aspects 1 to 24.

Aspect 28 is a non-transitory computer-readable storage medium storing computer executable code, where the code when executed by a processor causes the processor to implement any of aspects 1 to 24.

Various aspects have been described herein. These and other aspects are within the scope of the following claims.

What is claimed is:

1. An apparatus for wireless communication at a first network node, comprising:
   a memory; and
   at least one processor coupled to the memory and, based at least in part on information stored in the memory, the at least one processor is configured to:
     transmit a first indication of a physical layer (PHY) signature pool including a plurality of PHY signatures to a second network node;
     select at least one PHY signature from the plurality of PHY signatures;
     transmit a second indication of the selected at least one PHY signature to the second network node, wherein the second indication of the selected at least one PHY signature includes at least one PHY signature index associated with the selected at least one PHY signature; and
     transmit at least one message to the second network node based on the selected at least one PHY signature.

2. The apparatus of claim 1, wherein each PHY signature in the plurality of PHY signatures is an amplitude-modulation-to-phase-modulation (AMPM) signature or a frequency domain residual sideband (FDRSB) signature.

3. The apparatus of claim 1, wherein the first indication of the PHY signature pool is transmitted to the second network node via PHY signaling or layer 3 (L3) signaling, wherein the PHY signaling is not associated with a radio resource control (RRC) procedure and the L3 signaling is associated with the RRC procedure.

4. The apparatus of claim 1, wherein the second indication of the selected at least one PHY signature is transmitted to the second network node via PHY signaling or layer 3 (L3) signaling.

5. The apparatus of claim 1, wherein the PHY signature pool is associated with a lifetime of the PHY signature pool or a duration of the PHY signature pool.

6. The apparatus of claim 5, the at least one processor being further configured to: transmit a third indication of a revocation of the PHY signature pool to the second network node before an expiration of the lifetime or an expiration of the duration.

7. The apparatus of claim 1, wherein the at least one message is transmitted to the second network node using a plurality of radio frequency (RF) chains, and each PHY signature in the selected at least one PHY signature is associated with one or more respective RF chains in the plurality of RF chains.

8. The apparatus of claim 7, wherein the plurality of RF chains is associated with an RF chain combination index.

9. The apparatus of claim 7, wherein the plurality of RF chains includes a first subset of RF chains and a second subset of RF chains, the first subset of RF chains is associated with PHY impairment based on the selected at least one PHY signature, and the second subset of RF chains is not associated with the PHY impairment.

10. The apparatus of claim 9, the at least one processor being further configured to:
select the first subset of RF chains from the plurality of RF chains based on a modulation and coding scheme (MCS) associated with a codeword; and
transmit a fourth indication of the first subset of RF chains to the second network node.

11. The apparatus of claim 10, wherein the fourth indication of the first subset of RF chains is transmitted to the second network node via PHY signaling or layer 3 (L3) signaling.

12. The apparatus of claim 1, further comprising a transceiver coupled to the at least one processor.

13. A method of wireless communication at a first network node, comprising:
transmitting a first indication of a physical layer (PHY) signature pool including a plurality of PHY signatures to a second network node;
selecting at least one PHY signature from the plurality of PHY signatures;
transmitting a second indication of the selected at least one PHY signature to the second network node, wherein the second indication of the selected at least one PHY signature includes at least one PHY signature index associated with the selected at least one PHY signature.; and
transmitting at least one message to the second network node based on the selected at least one PHY signature.

14. The method of claim 13, wherein each PHY signature in the plurality of PHY signatures is an amplitude-modulation-to-phase-modulation (AMPM) signature or a frequency domain residual sideband (FDRSB) signature.

15. The method of claim 13, wherein the first indication of the PHY signature pool is transmitted to the second network node via PHY signaling or layer 3 (L3) signaling, wherein the PHY signaling is not associated with a radio resource control (RRC) procedure and the L3 signaling is associated with the RRC procedure.

16. An apparatus for wireless communication at a second network node, comprising:
a memory; and
at least one processor coupled to the memory and, based at least in part on information stored in the memory, the at least one processor is configured to:
receive a first indication of a physical layer (PHY) signature pool including a plurality of PHY signatures from a first network node;
receive a second indication of at least one PHY signature in the plurality of PHY signatures from the first network node, wherein the second indication of the at least one PHY signature includes at least one PHY signature index associated with the at least one PHY signature;
receive at least one message from the first network node based on the at least one PHY signature; and
demodulate the at least one message based on the at least one PHY signature.

17. The apparatus of claim 16, wherein each PHY signature in the plurality of PHY signatures is an amplitude-modulation-to-phase-modulation (AMPM) signature or a frequency domain residual sideband (FDRSB) signature.

18. The apparatus of claim 16, wherein the first indication of the PHY signature pool is received from the first network node via PHY signaling or layer 3 (L3) signaling, wherein the PHY signaling is not associated with a radio resource control (RRC) procedure and the L3 signaling is associated with the RRC procedure.

19. The apparatus of claim 16, wherein the second indication of the at least one PHY signature is received from the first network node via PHY signaling or layer 3 (L3) signaling.

20. The apparatus of claim 16, wherein the PHY signature pool is associated with a lifetime of the PHY signature pool or a duration of the PHY signature pool.

21. The apparatus of claim 20, the at least one processor being further configured to: receive a third indication of a revocation of the PHY signature pool from the first network node before an expiration of the lifetime or an expiration of the duration.

22. The apparatus of claim 16, wherein the at least one message is received from the first network node via a plurality of radio frequency (RF) chains at the first network node, and each PHY signature in the at least one PHY signature is associated with one or more respective RF chains in the plurality of RF chains.

23. The apparatus of claim 22, wherein the plurality of RF chains is associated with an RF chain combination index.

24. The apparatus of claim 22, wherein the plurality of RF chains includes a first subset of RF chains and a second subset of RF chains, the first subset of RF chains is associated with PHY impairment based on the at least one PHY signature, and the second subset of RF chains is not associated with the PHY impairment.

25. The apparatus of claim 24, the at least one processor being further configured to:
receive a fourth indication of the first subset of RF chains from the first network node, wherein the first subset of RF chains is based on a modulation and coding scheme (MCS) associated with a codeword.

26. The apparatus of claim 25, wherein the fourth indication of the first subset of RF chains is received from the first network node via PHY signaling or layer 3 (L3) signaling.

27. The apparatus of claim 16, further comprising a transceiver coupled to the at least one processor.

28. A method of wireless communication at a second network node, comprising:
receiving a first indication of a physical layer (PHY) signature pool including a plurality of PHY signatures from a first network node;
receiving a second indication of at least one PHY signature in the plurality of PHY signatures from the first network node, wherein the second indication of the at least one PHY signature includes at least one PHY signature index associated with the at least one PHY signature;
receiving at least one message from the first network node based on the at least one PHY signature; and
demodulating the at least one message based on the at least one PHY signature.

29. The method of claim 28, wherein each PHY signature in the plurality of PHY signatures is an amplitude-modulation-to-phase-modulation (AMPM) signature or a frequency domain residual sideband (FDRSB) signature.

30. The method of claim 28, wherein the first indication of the PHY signature pool is received from the first network node via PHY signaling or layer 3 (L3) signaling, wherein the PHY signaling is not associated with a radio resource control (RRC) procedure and the L3 signaling is associated with the RRC procedure.

* * * * *